United States Patent
Baker

(10) Patent No.: US 6,457,438 B1
(45) Date of Patent: Oct. 1, 2002

(54) ANIMAL CONTAINER

(76) Inventor: Michael D. Baker, P.O. Box 87603, Vancouver, WA (US) 97330

( * ) Notice: Subject to any disclaimer, the term of this patent is extended or adjusted under 35 U.S.C. 154(b) by 0 days.

(21) Appl. No.: 09/676,641

(22) Filed: Sep. 30, 2000

Related U.S. Application Data

(63) Continuation-in-part of application No. 09/250,694, filed on Feb. 16, 1999, now Pat. No. 6,152,081.

(51) Int. Cl.⁷ .......................... A01K 1/035; A47D 9/02
(52) U.S. Cl. .................. 119/498; 119/499; 119/452; 119/474; 119/504; 5/105; 5/108
(58) Field of Search ................ 119/498, 499, 119/482, 452, 502, 474, 472, 504, 480, 484; 5/105, 108; D30/114, 120

(56) References Cited

U.S. PATENT DOCUMENTS

| | | | |
|---|---|---|---|
| 89,953 A | | 5/1869 | Swartz |
| 246,729 A | | 9/1881 | Darne |
| 744,993 A | | 11/1903 | Barta |
| 855,551 A | | 6/1907 | Avara |
| 1,168,836 A | * | 1/1916 | Vette |
| 1,170,794 A | | 2/1916 | Barnes |
| 1,203,080 A | | 10/1916 | Vanek |
| 1,383,727 A | | 7/1921 | Kohn |
| 1,433,777 A | | 10/1922 | Brown |
| 1,669,300 A | * | 5/1928 | Hunter |
| 1,893,918 A | | 1/1933 | Wilson |
| 2,581,318 A | * | 1/1952 | Bartlett |
| 2,688,997 A | | 9/1954 | Miller |
| 2,736,041 A | * | 2/1956 | Maloof |
| 2,892,562 A | * | 6/1959 | Smithson |
| 3,116,847 A | | 1/1964 | Collins |
| 3,529,311 A | * | 9/1970 | Crawford |
| 3,858,555 A | | 1/1975 | Smith |
| 4,208,037 A | * | 6/1980 | Gal ............................ 256/25 |
| 4,375,111 A | * | 3/1983 | Hall ............................. 5/419 |
| 4,615,059 A | | 10/1986 | Darowski |
| 4,763,606 A | * | 8/1988 | Ondrasik, II ................ 119/474 |
| 5,088,139 A | * | 2/1992 | Bloom .......................... 5/420 |
| 5,564,367 A | * | 10/1996 | Boyanton ................... 119/474 |
| 5,711,252 A | | 1/1998 | Brandolino |
| 5,803,018 A | | 9/1998 | Liou |
| 5,806,113 A | | 9/1998 | McMahan et al. |
| 5,967,089 A | * | 10/1999 | Allen .......................... 119/474 |

* cited by examiner

Primary Examiner—Charles T. Jordan
Assistant Examiner—Yvonne R. Abbott

(57) ABSTRACT

A device for confining an animal such as a dog is disclosed. The device consists of a plurality of sides, an unstable support element attached to each of the plurality of sides and a plurality of couplers for coupling each of the plurality of sides. The couplers allow relative movement of the sides such that pressing against one of the plurality of sides produces movement that discourages contact with the plurality of sides. If a dog contained in the device attempts to escape by scaling a side of the device, the relative movement of the plurality of sides will startle the dog. Consequently, the dog immediately moves away from the side and within minutes typically abandons any attempt to escape.

25 Claims, 10 Drawing Sheets

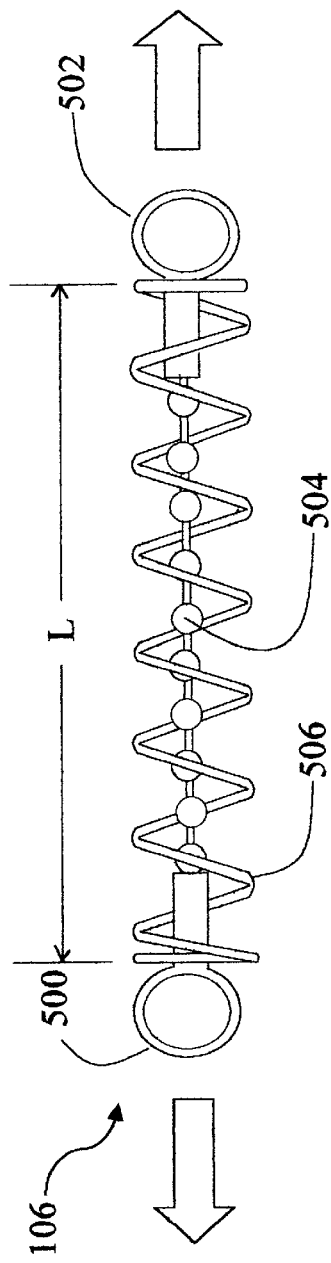
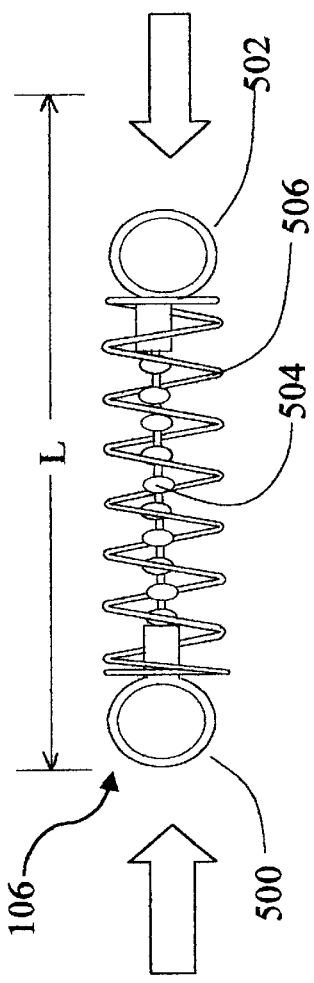
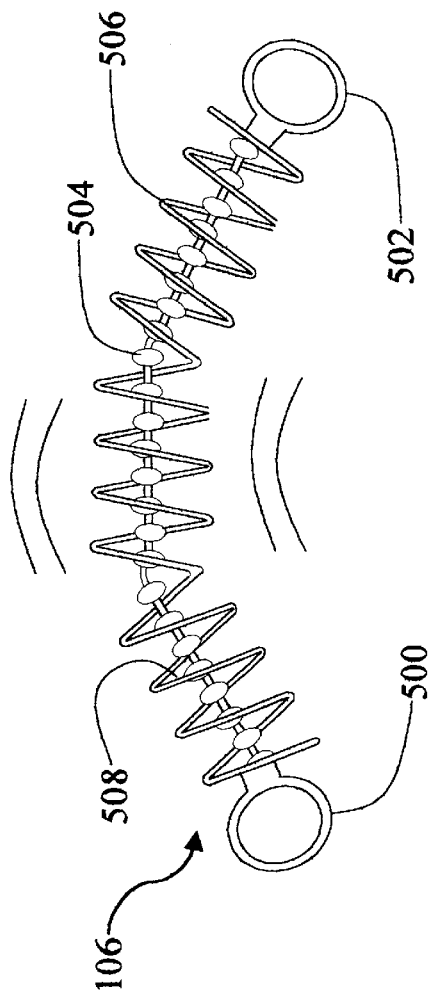
Figure 5a
Figure 5b
Figure 5c

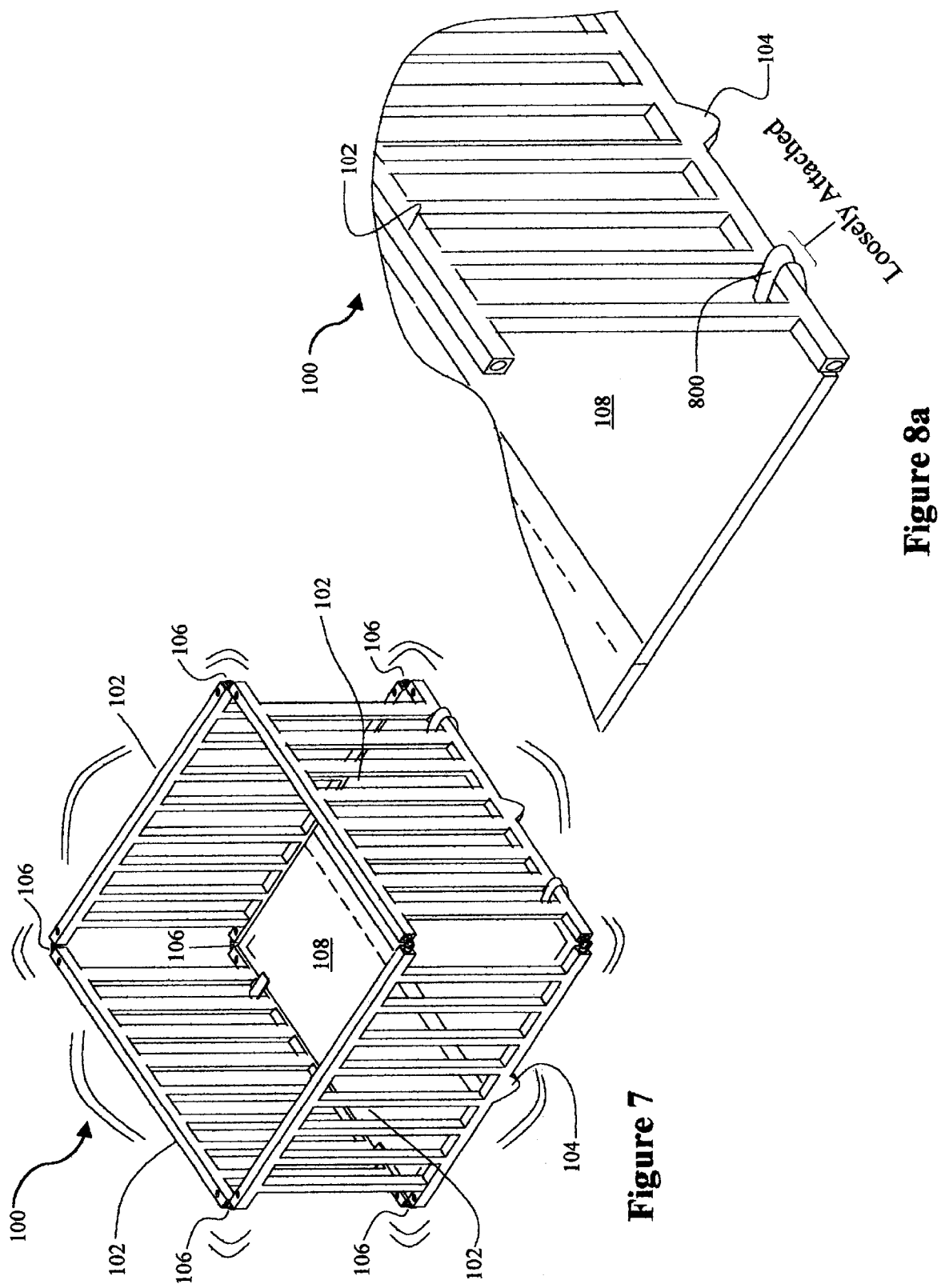

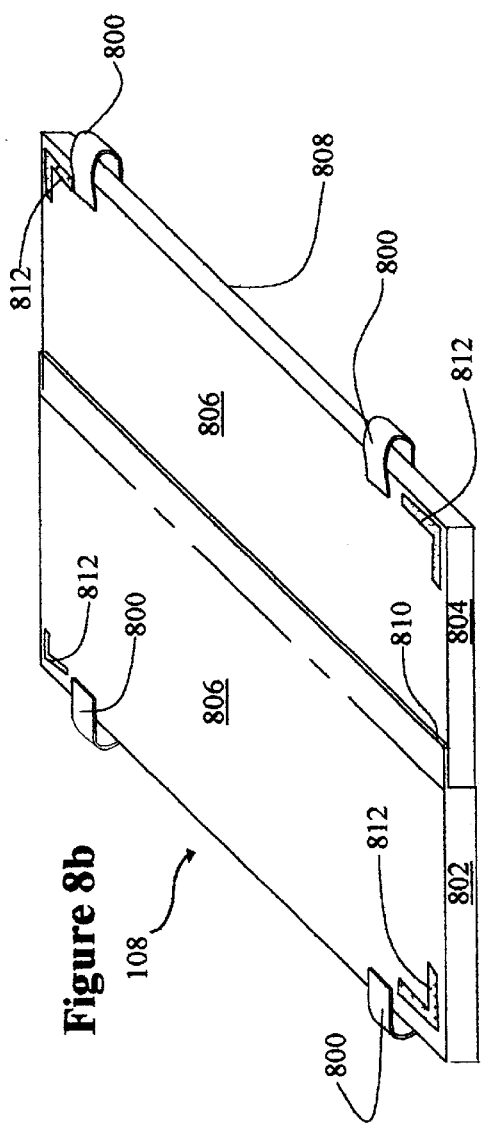
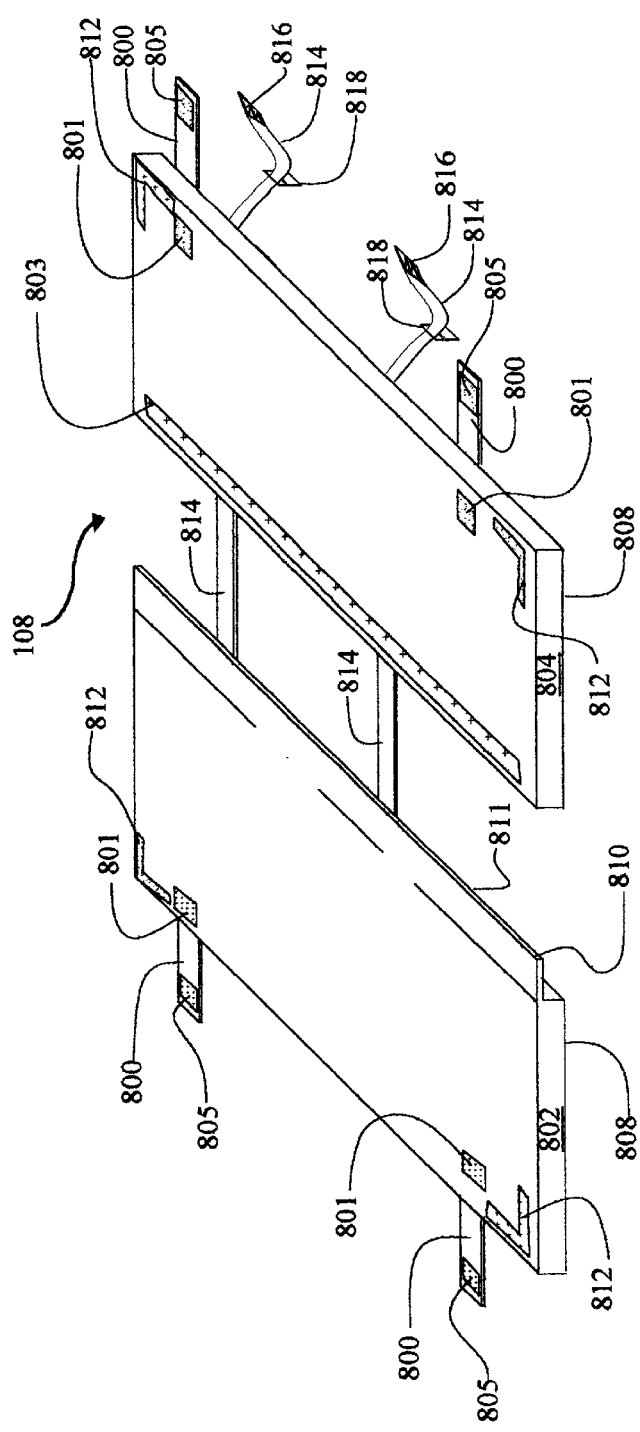
Figure 8b
Figure 8c

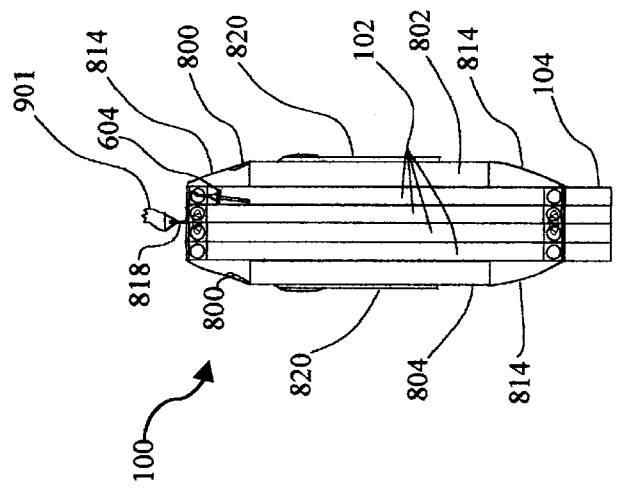
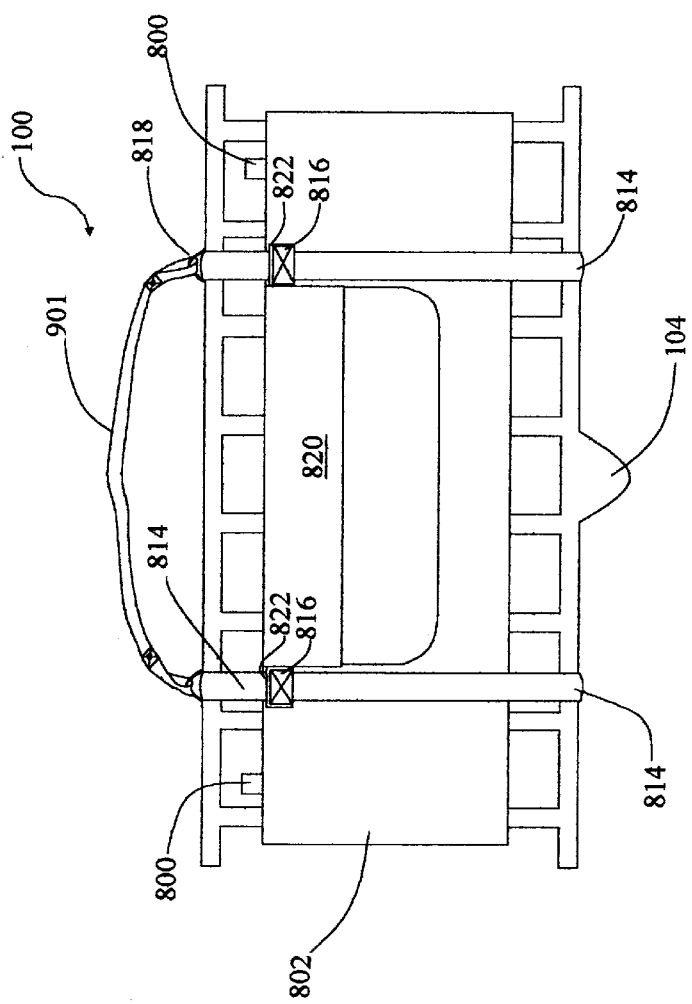

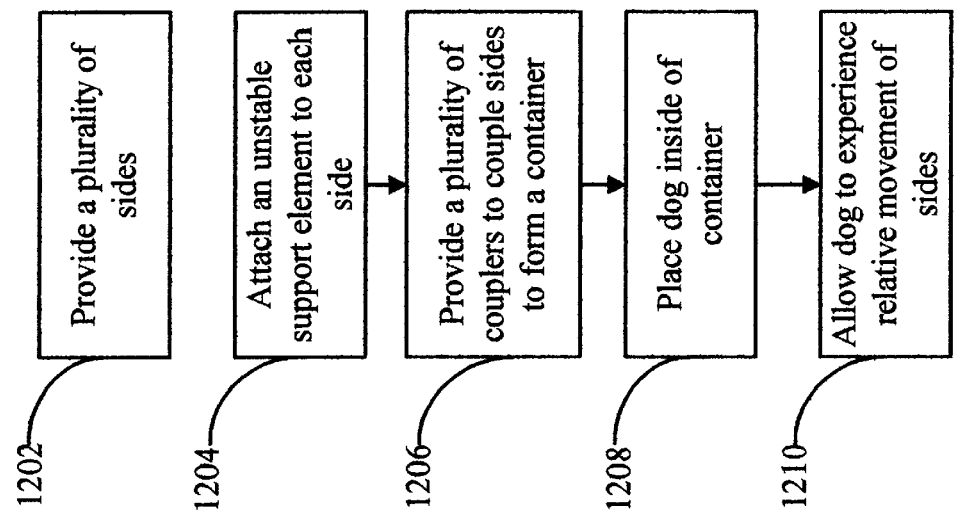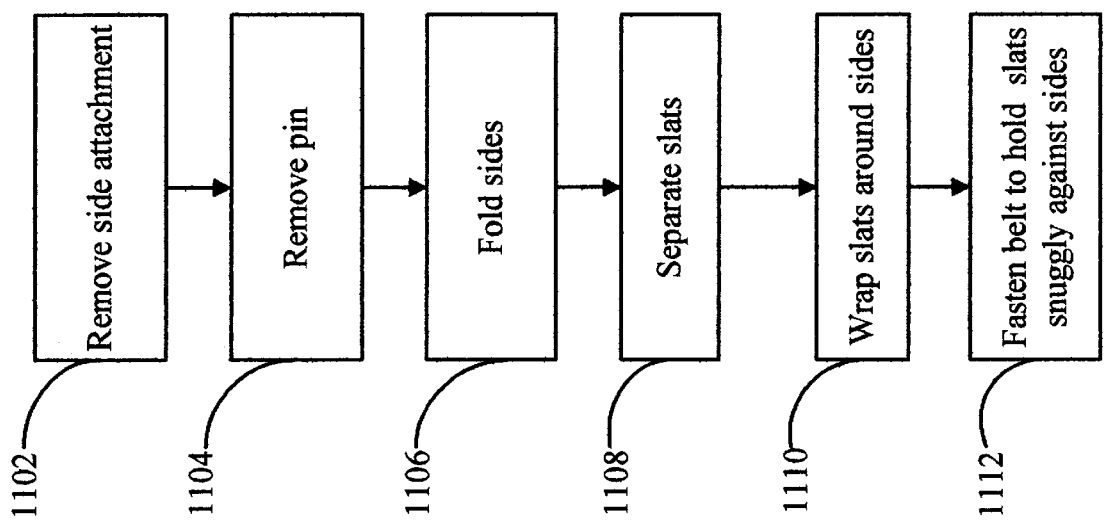

ANIMAL CONTAINER

CROSS REFERENCE TO RELATED APPLICATIONS

This invention is a continuation in part of U.S. patent application Ser. No. 09/250,694 filed by Michael D. Baker on Feb. 16, 1999 now U.S. Pat. No. 6,152,081 entitled "Quasistable Dog Kennel" the entire contents of which are incorporated herein by reference.

BACKGROUND OF THE INVENTION

This invention is related to containers for animals and specifically to a quasi-stable container for dogs.

Dog owners frequently desire to temporarily confine their dog in a container. A typical container for confining a dog contains sides made of wire mesh or molded plastic. Molded plastic containers typically have small slots formed in the sides so that the confined dog can not see outside of the container. An objective of manufacturers of dog containers is to provide a container that confines the dog completely thereby eliminating any possibility of the dog escaping. This objective is typically accomplished through designing containers having a floor, at least four side and a top, all of which are rigidly clamped together not withstanding a door typically formed in one of the sides.

Some manufacturers of dog containers provide containers that are collapsible and transportable. These containers are often cumbersome to use and frequently require removing hardware such as screws and bolts before the container can be disassembled. Assembling or disassembling these containers is time consuming and the hardware used in this process is easily misplaced or lost.

Many dog owners are typically reluctant to place their dog in conventional dog containers because: (a) the containers give the perception that the dog is incarcerated, (b) the dog may appear to be uncomfortable, and (c) the owner cannot pet the dog once the dog is confined to the container. Furthermore, conventional containers are typically neutral in color or of a color that is unlikely to match the decor of the dog owner's home.

SUMMARY

A device for confining an animal such as a dog is disclosed. The device consists of a plurality of sides, an unstable support element attached to each of the plurality of sides for supporting each of the plurality of sides in an unstable manner and a plurality of couplers for coupling each of the plurality of sides. The couplers allow relative movement of adjacent sides of the plurality of sides such that pressing against one of the plurality of sides produces movement that discourages contact with the plurality of sides.

BRIEF DESCRIPTION OF THE DRAWINGS

FIG. 5a–5c shows a side view of a coupler consisting of a first end, a second end, a ball chain and a spring. The coupler functions as a flexible spring which allows the sides to move relative to each other.

FIG. 7 is a perspective view of the device wherein the relative movement of the sides about their respective unstable support element is illustrated.

FIG. 8a is an enlarged perspective view of a portion of the device previously shown in FIG. 1 wherein the floor platform is loosely attached to the sides via side attachments.

FIG. 8b is a perspective view of the floor platform having been removed from the device.

FIG. 8c is a perspective view of the floor platform previously shown in FIG. 8b. The floor platform has a first separable slat and a second separable slat which are substantially separated.

FIG. 9a is a side view of the device wherein the slats (located on opposing sides of the device) of the floor platform have been separated and wrapped around the device's sides.

FIG. 9b is a front view of the device previously shown in FIG. 9a wherein first separable slat and second separable slat are wrapped around the sides.

FIG. 11 is a block diagram describing a method of preparing the device for carrying and storage.

FIG. 12 is a block diagram describing a method of containing a dog in the device.

DETAILED DESCRIPTION

Figure 1:
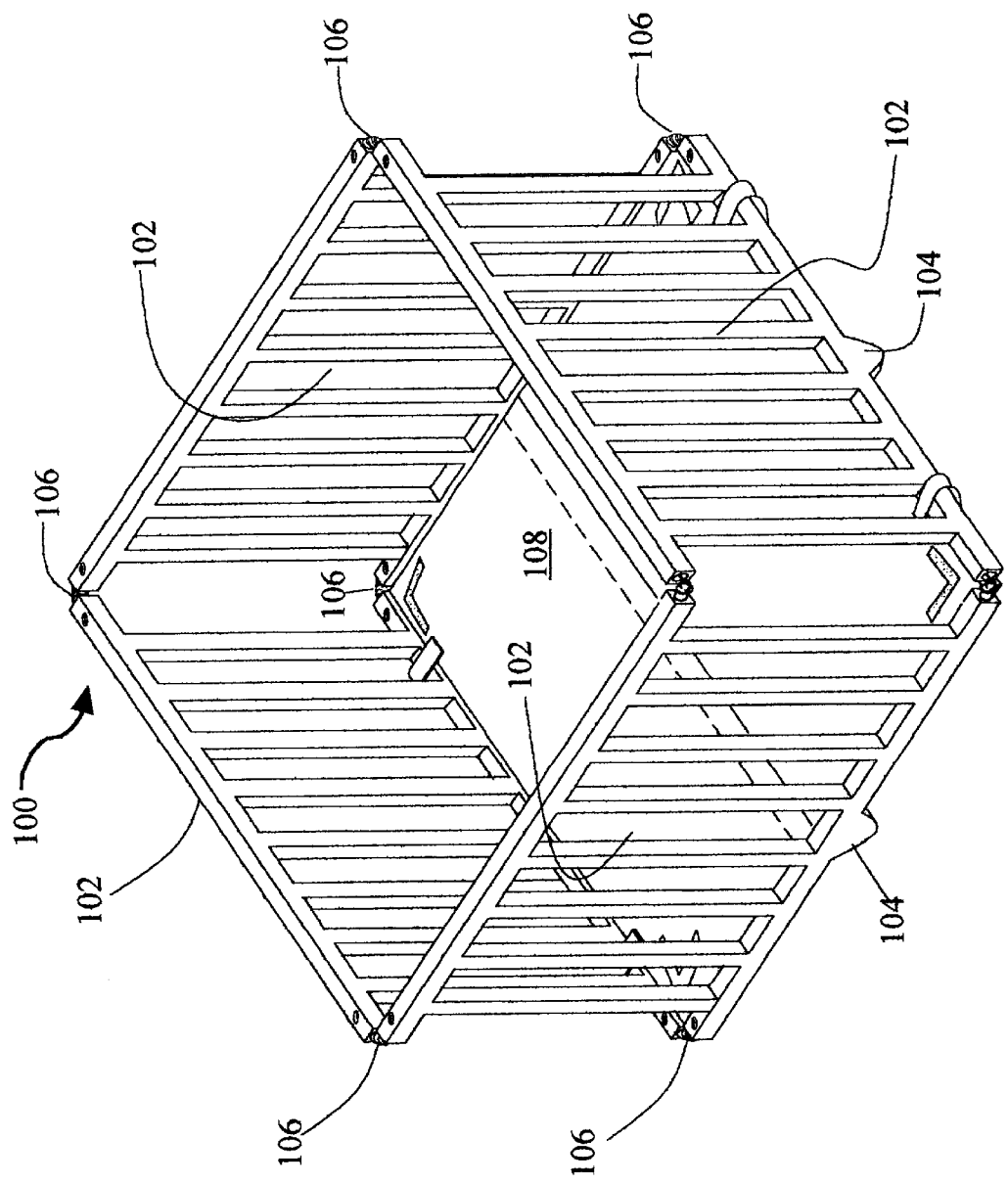
FIG. 1 is a perspective view of a preferred embodiment of the current invention wherein a device used to contain an animal such as a dog is shown. The device contains sides that move relative to each other and a floor platform.

FIG. 1 is a perspective view a device 100 used to contain an animal such as a dog. In a preferred embodiment of the present invention, device 100 contains a plurality of identical sides 102 and a floor platform 108. Sides 102 are loosely attached and are capable of moving relative to each other and to the floor platform 108. Floor platform 108 functions as a mat upon which the dog rests and as a carrying case for device 100.

When a dog contained in device 100 attempts to escape by scaling sides 102, sides 102 will move relative to each other thereby startling the dog. Consequently, the dog immediately moves away from sides 102 and within minutes typically abandons any attempt to escape. Since the relative movement of sides 102 discourages the dog from escaping, device 100 does not require a top to confine the dog. A top however, can be used with device 100 if so desired. Furthermore, device 100 may be used without floor platform 108 as long as the relative movement of sides 102 is not impaired. In essence, the relative movement of sides 102 resulting from the dog physically contacting sides 102 works in conjunction with the dog's innate instinct to typically move away from unstable objects. Hence, the dog avoids making physical contact with sides 102 and is therefore contained therein.

Device 100 shown in FIG. 1 has four identical sides 102 although device 100 can have more or less than four identical sides. Because sides 102 are identical, reference number 102 is used to refer to a side of device 100 or sides of device 100. Each side 102 of device 100 has an unstable support element 104 upon which each side 102 rests. Sides 102 are loosely coupled by couplers 106 and, consequently, are capable of moving relative to each other about their respective unstable support elements 104. Floor platform 108 is loosely coupled to sides 102 so that relative movement of sides 102 is not inhibited.

Figure 2A:
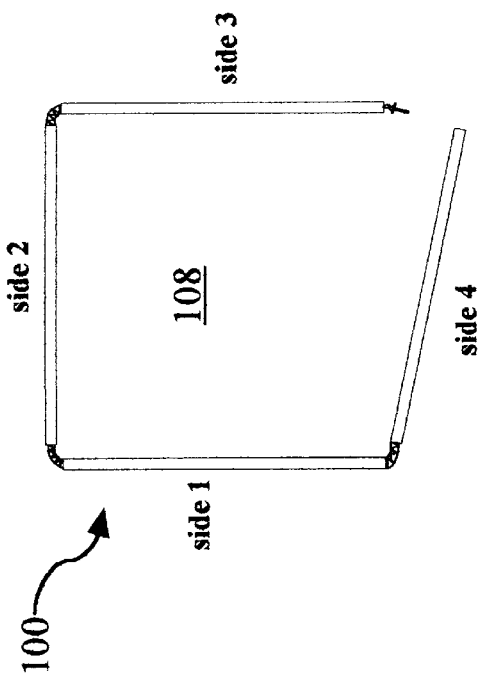
FIGS. 2a–2d is a top view of the device shown in FIG. 1 wherein the sides are coupled by couplers and are folded.
Figure 2B:
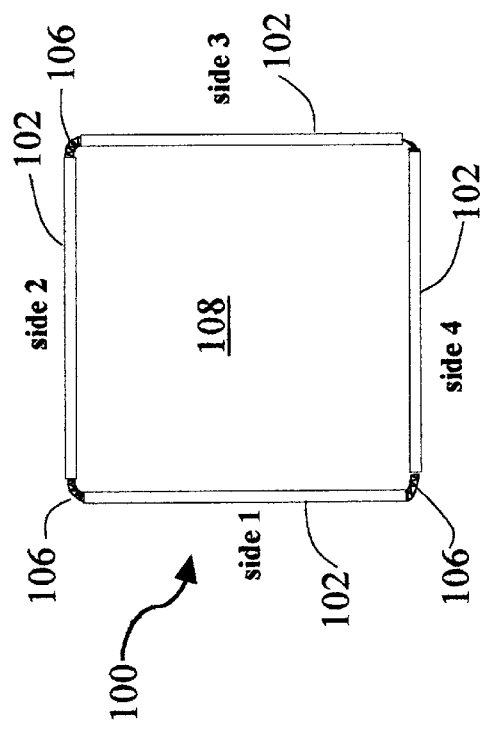
Figure 2D:
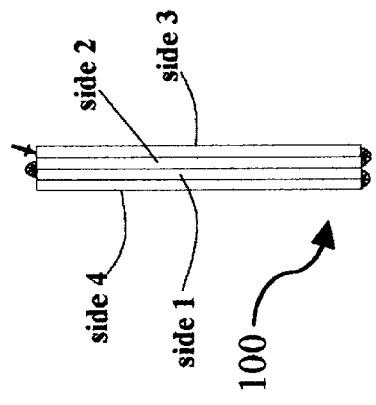
Figure 2C:
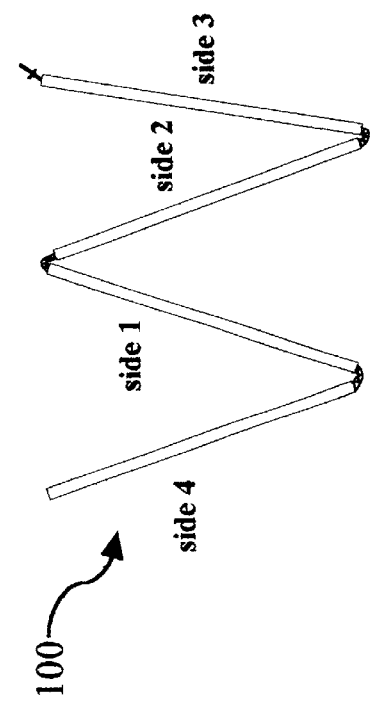

FIG. 2a is a top view of device 100 shown in FIG. 1 wherein couplers 106 allow sides 102 to be folded. To illustrate how sides 102 of device 100 are folded, sides 102 will be described as four separate identical sides illustrated by side 1, side 2, side 3, and side 4 in FIG. 2a–FIG. 2d. Side 1 through side 4 referenced in the FIG. 2a are attached by couplers 106 and completely surround floor platform 108. FIG. 2b is a top view of FIG. 2a wherein side 4 is detached from side 3. FIG. 2c is a top view of FIG. 2b wherein floor platform 108 has been removed and side 4 is positioned adjacent to side 1. FIG. 2d is a top view of FIG. 2c wherein side 1 through side 4 of device 100 have been completely folded. In the folded position, sides 102 are easily transported or stored.

Figure 3A:
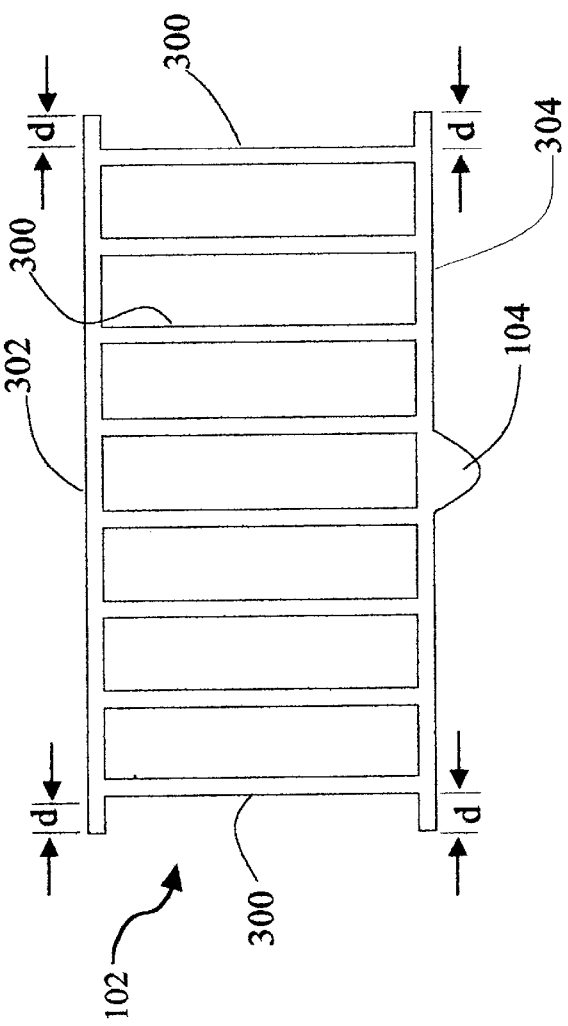
FIG. 3a is an enlarged front view of a side of the device. The side has equally spaced vertical members attached to upper horizontal and lower horizontal members and an unstable support element.

FIG. 3a is an enlarged front view of a side 102 of device 100. In a preferred embodiment of the present invention, side 102 has vertical members 300. Vertical members 300 are equally spaced by a distance sufficient to contain the dog. Vertical members 300 are attached to a upper horizontal member 302 and a lower horizontal member 304. Upper horizontal member 302 and lower horizontal member 304 extend a distance "d" beyond outer vertical member 300 as shown in FIG. 3a. Distance "d" allows separation between adjacent sides 102 so. that sides 102 move freely without touching each other as illustrated in FIG. 2a.

Sides 102 (FIG. 3a) have unstable support element 104 attached to lower horizontal member 304. Unstable support element 104 is positioned on lower horizontal member 304 such that side 102 will teeter and totter about unstable support element 104 when side 102 is held in an upright position as illustrated in FIG. 1. Thus, the unstable support element 104 supports the weight of side 102 in an unstable manner. Although unstable support element 104 shown in FIG. 3a is in the form of a rocker, a dowel or analogous object extending downward from lower horizontal member 304 upon which side 102 will teeter and totter will work as well.

Figure 3B:
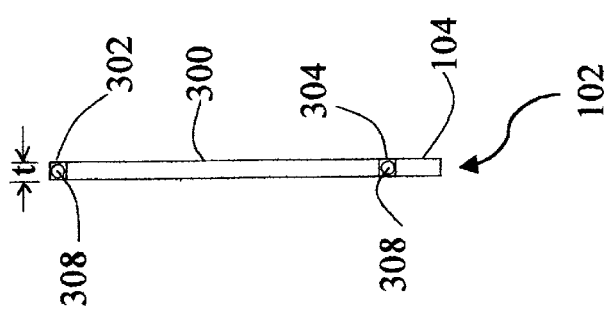
FIG. 3b is a side view of a side of the device previously shown in FIG. 3a wherein the side has a thickness "t" between 0.25 inches and 1.0 inch.

FIG. 3b shows a front view of side 102. In a preferred embodiment, thickness "T" is between 0.25 inches and 1.0 inch. Thickness in this range allows for a combined thickness of 4.0 inches or less when sides 102 are folded in preparation for storing or transporting as shown in FIG. 2d. Side 102, as shown in FIG. 3b, contains a cavity 308 configured to receive coupler 106. Cavity 308 extends between 0.33 inches and 1.33 inches into upper horizontal member 302 and lower horizontal member 304.

Figure 4:
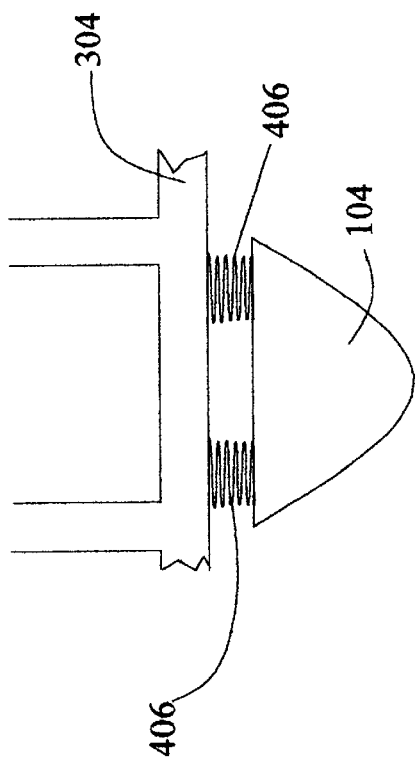
FIG. 4 is a side view of an unstable support element attached to the lower horizontal member via unstable support element springs.

FIG. 4 shows unstable support element 104 attached to lower horizontal member 304 via unstable support element springs 406. Unstable support element springs 406 have a predetermined spring constant which allows unstable support element springs 406 to easily bend while being rigid enough to hold unstable support element 104 firmly to lower horizontal member 304. This configuration increases the relative movement of sides 102 about unstable support element 104 when sides 102 are coupled by couplers 106 as shown in FIG. 1.

FIG. 5a shows a side view of coupler 106. Coupler 106 consists of a first end 500, a second end 502, a ball chain 504 and a spring 506. Coupler 106 functions as a flexible hinge, which allows sides 102 to move relative to each other about unstable support element 104 while prohibiting separation of the sides 102. Additionally, coupler 106 further allows folding of the sides as shown in FIG. 2a–FIG. 2d. Ball chain 504 is attached to first end 500 and second end 502 and can not be stretched beyond a predetermined length "L" as shown in FIG. 5a. If a stretchable material, in contrast to ball chain 504, is used to couple first end 500 and second end 502, the confined dog may attempt to force sides 102 apart and possibly get its head lodged between adjacent sides 102. Spring 506 is flexible and surrounds ball chain 504. Additionally, spring 506 forces first end 500 and second end 502 apart as indicated by hollow arrows shown in FIG. 5a. In a preferred embodiment, coupler 106 is formed of a stretchable and non-stretchable material. For example, the non-stretchable material is selected from a group of materials comprising wire, cable, plastic and cloth whereas the flexible material is selected from the group comprising rubber, springs, and chains.

FIG. 5b shows coupler 106 previously shown in FIG. 5a. Here, spring 506 is compressed thereby causing slack in ball chain 504. Additionally, compressing spring 506, as indicated by the hollow arrows in FIG. 5b, causes first end 500 and second end 502 to fall substantially within length "L". Coupler 106 may be compressed as shown in FIG. 5b when the confined dog attempts to scale side 102 of device 100 causing adjacent upper horizontal member 302 or adjacent lower horizontal member 304 to move closer together as sides 102 teeter and totter about unstable support element 104. In contrast, FIG. 5c shows a configuration of coupler 106 previously shown in FIG. 5a where spring 506 and ball chain 504 are bent. Coupler 106 is bent in this way as adjacent sides teeter and totter or when sides 102 are folded as shown in FIG. 2a–FIG. 2d. As spring 506 expands and contracts, ball chain 504 rubs against inner spirals 508 (FIG. 5c) of spring 506. The rubbing of ball chain 504 against inner spirals 508 of spring 506 creates a screeching sound which further startles the dog thereby causing the dog to move away from sides 102. Although commercially available ball chain 504 is used to connect first end 500 and second end 502 of coupler 106, cable, wire, plastic or rope may be used as well. Additionally, flexibility provided by spring 506 may be achieved using an elastic material such as rubber.

Figure 6A:
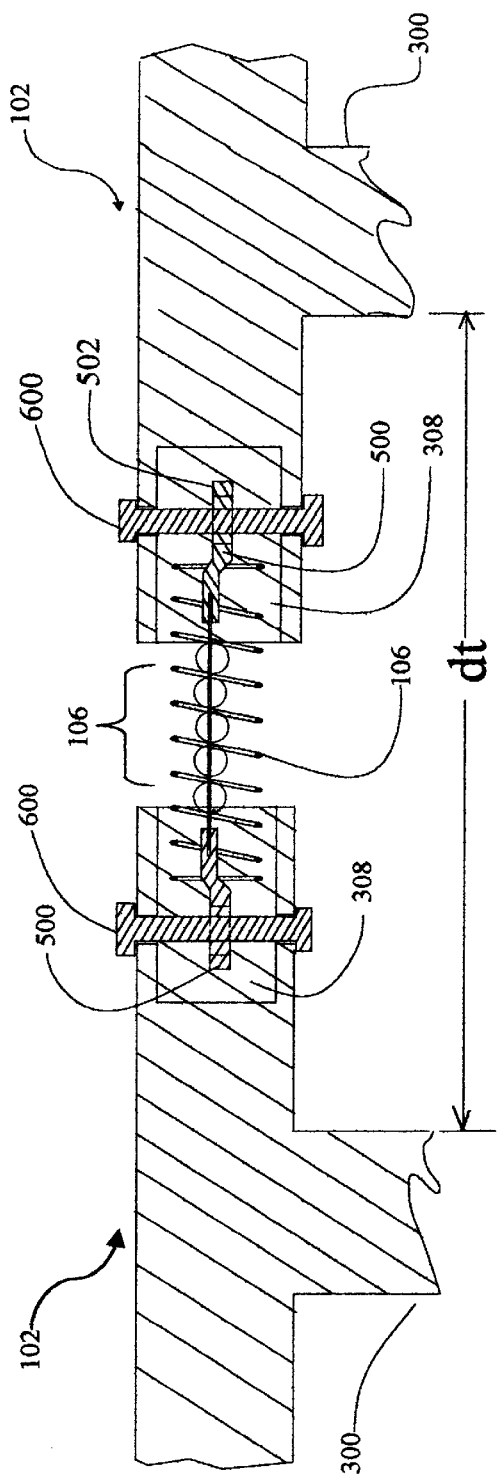
FIG. 6a is an enlarged partial view of two adjacent sides 102 wherein the coupler, previously shown in FIG. 5a, couples adjacent sides of the device.

FIG. 6a is an enlarged partial view of two adjacent sides 102 wherein coupler 106, previously shown in FIG. 5a, attaches adjacent sides 102 of device 100. First end 500 of coupler 106 is attached to side 102 and second end 502 is attached to the next adjacent identical side 102. First end 500 and second end 502 are attached to sides 102 with bolts 600. Coupler 106 keeps sides 102 separated by a distance "dt" (FIG. 6a) which is measured from vertical members 300 of adjacent identical sides 102. This distance is chosen such that a typical dog's head will not fit between the coupled sides 102.

Figure 6B:
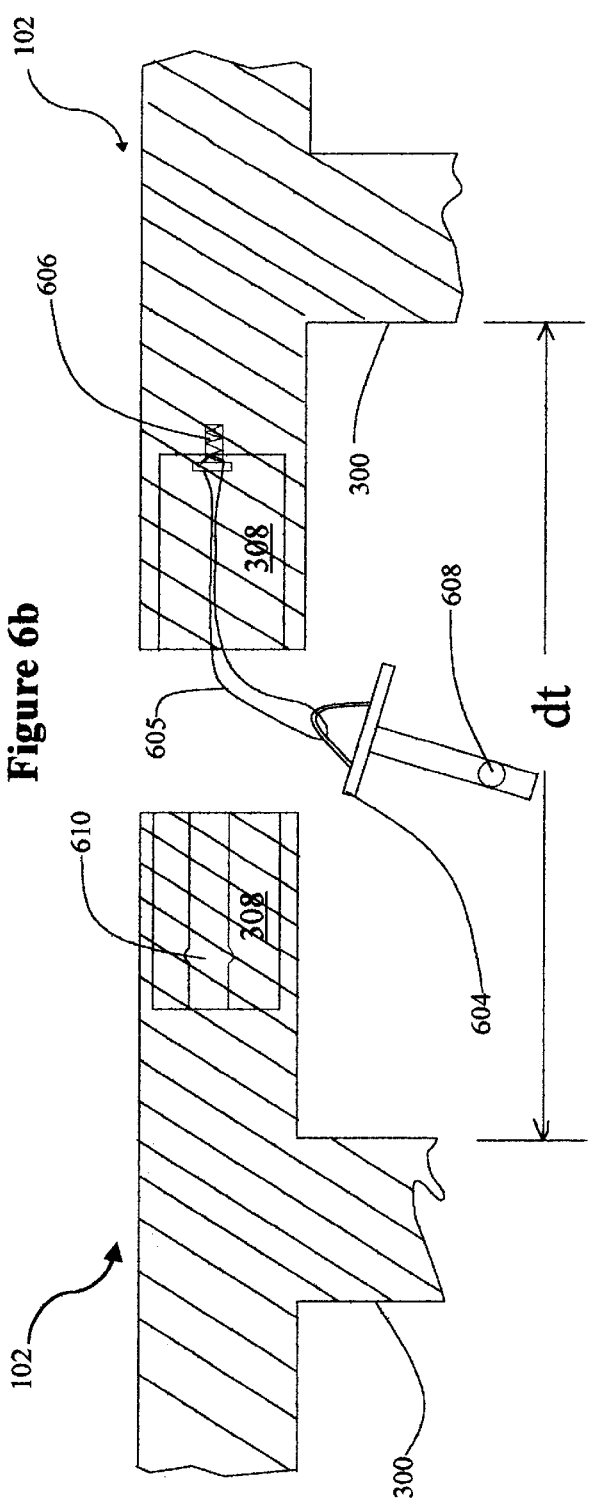
FIG. 6b is an enlarged partial view of two adjacent sides.

FIG. 6b is an enlarged partial view of two adjacent sides 102 that are attached by a pin 604 instead of coupler 106 although all sides 102 of device 100 may be coupled using coupler 106. Both upper horizontal member 302 and lower horizontal member 304 (not shown) contain pin 604. Pin 604 is affixed to side 102 using a chain 605 and a screw 606. Screw 606 is positioned inside of cavity 308. A sleeve 610, positioned inside of cavity 308 of the adjacent side 102, receives pin 604. A ball bearing 608 is embedded in pin 604 and serves to lock pin 604 inside of sleeve 610. Opening a side 102 of device 100 requires grasping and pulling pin 604 until ball bearing 608 detaches from sleeve 610. Side 102 containing pin 604 is separated from an adjacent side 102 by the same distance "dt" as sides 102 attached using coupler 106. Chain 605 allows adjacent sides attached by pin 604 to freely move relative to each other. This freedom of motion enhances the effectiveness of device 100 in startling the confined dog when the dog physically contacts sides 102.

FIG. 7 shows a perspective view of device 100 wherein the relative movement of sides 102 about their respective unstable support elements 104 is emphasized. Because of the substantial flexible nature of coupler 106 previously described, sides 102 of device 100 not only teeter and totter about unstable support element 104 but twist and shift as well. Relative twisting and shifting of sides 102 varies depending on where the contained dog places its weight as it M attempts to scale sides 102. Device 100 is "stable enough" to prevent the dog from escaping through or between sides 102 yet "unstable enough" to substantially startle the dog to prevent it from attempting to scale sides 102. In this regard, device 100 is "quasi-stable".

FIG. 8a is a perspective view of a portion of device 100 previously shown in FIG. 7. Here floor platform 108 is shown loosely attached to side 102 via side attachments 800. Side attachments 800 are detachable so that device 100 can be folded and transported as illustrated in FIG. 2a–FIG. 2d. Loosely attaching floor platform 108 to sides 102 allows sides 102 to freely move about unstable support element 104 when sides 102 are physically contacted by the contained dog. Floor platform 108 is stationary, thus providing the dog with an area wherein the dog can retreat after experiencing the relative movement of sides 102.

FIG. 8b is a perspective view of floor platform 108 having been removed from device 100. Floor platform 108 functions as a sleeping mat for the dog and as a carrying case as will be described in more detail shortly. Floor platform 108 consists of a first separable slat 802 and second separable slat 804. First separable slat 802 and second separable slat 804 have a top side 806 and a bottom side 808. First separable slat 802 has a lip 810 which attaches to second separable slat 804 such that top side 806 of floor platform 108 is continuous across first separable slat 802 and second separable slat 804. Top side 806 also contains fasteners 812 for attaching a washable cover to top side 806 as will be described shortly. Additionally, first separable slat 802 and second separable slat 804 are padded with a soft, water-resistant material for the dog's comfort.

FIG. 8c is a perspective view of floor platform 108 previously shown in FIG. 8b. Here first separable slat 802 and second separable slat 804 of floor platform 108 are separated in preparation to be wrapped around sides 102 when sides 102 are folded as illustrated in FIG. 2d. The separation distance of first separable slat 802 and second separable slat 804 is fixed by belt 814 which is substantially attached to bottom side 808 of floor platform 108. A portion of belt 814 extends beyond second separable slat 804 and has a fastener 816 attached thereto. Belt 814 may be formed of an elastic or non-elastic flexible material. When first separable slat 802 and second separable slat 804 are attached as shown in FIG. 8b, belt 814 is concealed beneath bottom side 808. Second separable slat 804 has second separable slat fastener 803 configured to receive lip 810. Lip 810 has a lip fastener 811 configured to receive second separable slat fastener 803.

Side attachment 800 contains a side attachment fastener 805 configured to attach to to side attachment slat fastener 801. In a preferred embodiment, side attachment fastener 805 and side attachment slat fastener 801 are made of Velcro although any secure fastening mechanism will work as well. A buckle 818 (FIG. 8c) is positioned on belt 814 adjacent to fastener 816. Buckle 818 is configured to receive a strap used for the dual purpose of supporting device 100 when device 100 is carried and as a leash for walking the dog.

Figure 8D:
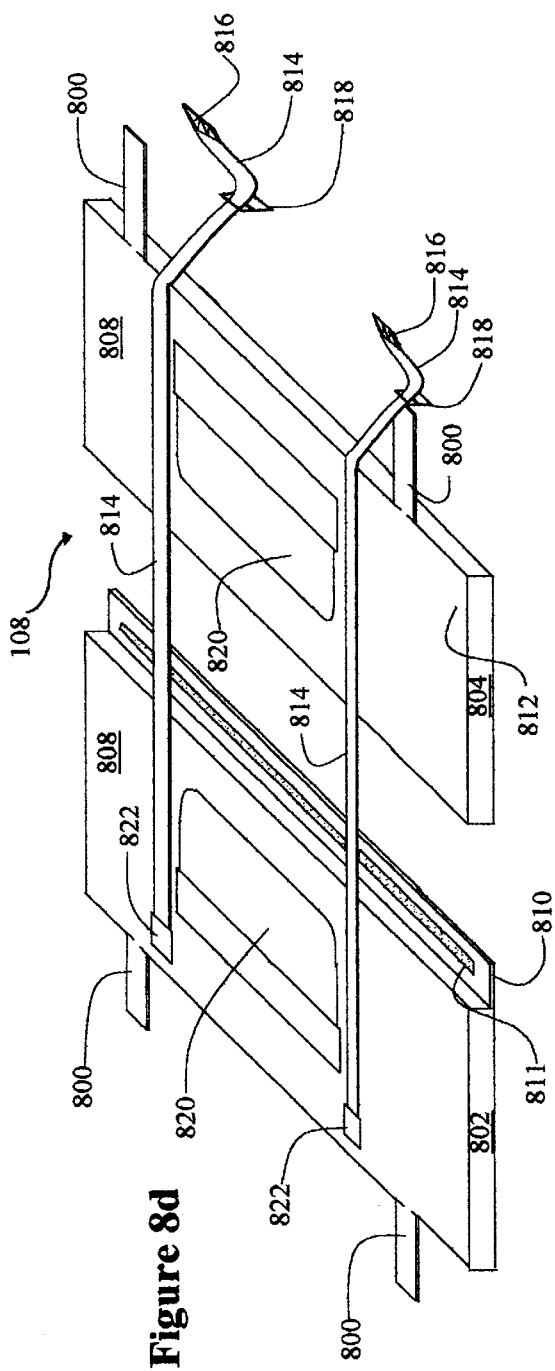
FIG. 8d is a perceptive view of floor platform previously shown in FIG. 8c except the floor platform has been flipped over thereby revealing pockets positioned on first separable slat and second separable slat of the floor platform.

FIG. 8d is a perspective view of floor platform 108 previously shown in FIG. 8c except floor platform 108 has been flipped such that bottom side 808 is facing upward. First separable slat 802 and second separable 804 contain pockets 820 positioned on bottom side 808. Pockets 820 are used to store accessories and dog food/supplies when device 100 is transported. Additionally, belt 814, shown in FIG. 8d, has a belt fastener 822 configured to receive fastener 816 when first, separable slat 802 and second separable 804 are wrapped around sides 102.

FIG. 9a is a side view of device 100 wherein first separable slats 802 and second separable slat 804 (shown on opposing sides of device 100) of floor platform 108 have been separated and wrapped around sides 102. Floor platform 108 is wrapped around sides 102 such that pockets 820 are accessible. Fastener 816 of belt 814 attaches to corresponding belt fastener 822 attached to first separable slat 802. Fastener 816 snugly holds first separable slats 802 and second separable slat 804 around folded sides 102 as shown in FIG. 9a. FIG. 9b is a front view of device 100 previously shown in FIG. 9a. Here, belt 814 positioned around sides 102, buckle 818, and side attachment 800 are revealed. Once device 100 is configured in this way, device 100 is easily carried by attaching a strap 901 to buckles 818. Strap 901 serves the dual function of allowing device 100 to be carried, preferably by positioning strap 901 over a person's shoulder, and as a leash for walking the dog.

Figure 10:
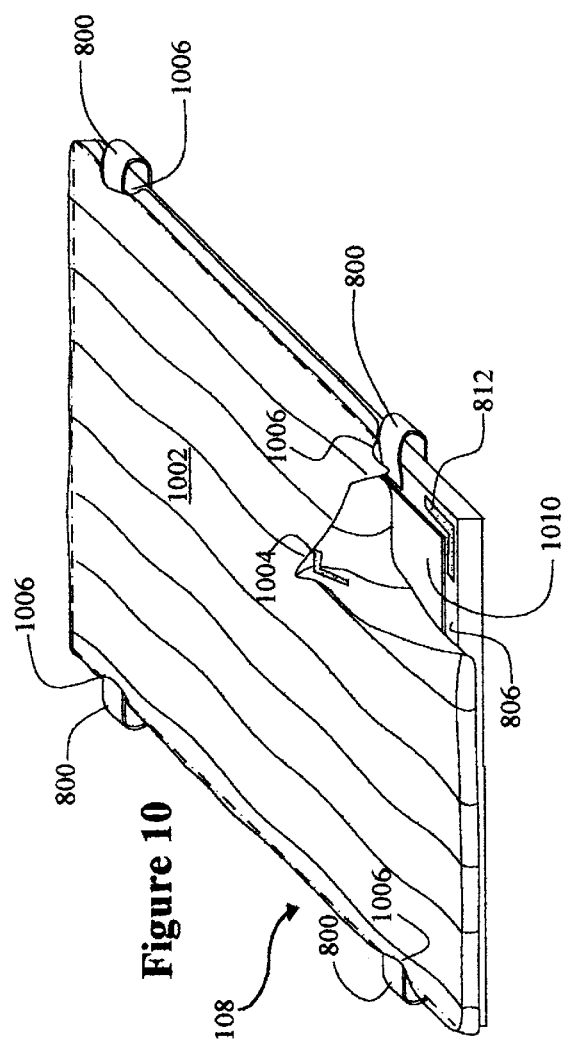
FIG. 10 is a perspective view of the floor platform previously shown in FIG. 8b except a cover and a scented sheet have been attached to the topside of the floor platform.

FIG. 10 is a perspective view of floor platform 108 previously shown in FIG. 8b except a cover 1002 has been attached to topside 806 of floor platform 108. Cover 1002 contains a plurality of cover connectors 1004 and a side attachment slit 1006. Cover connectors 1004 attach to fasteners 812 located on top side 806 of floor platform 108 such that cover 1002 is held snuggly to floor platform 108. Side attachment slit 1006 formed in clover 1002 allows side attachment 800 to be wrapped around lower horizontal member 304 (See FIG. 8a). In a preferred embodiment, cover 1002 is formed of a permanent, soft, designer fabric that is washable, although, one skilled in the art will appreciate that cover 1002 may be disposable as well. A dog owner may have several covers 1002 varying in color and pattern. These covers 1002 may be As chosen to match the decor of the dog owner's home. When one cover 1002 is spoiled, a new cover 1002 can readily replace the spoiled cover 1002 while the spoiled cover 1002 is laundered. Additionally, a disposable scented sheet is optionally inserted between cover 1002 and top side 806 of floor platform 108. Scented sheet 1010 contains a deodorizer that slowly dispenses through cover 1002 and onto the enclosed dog.

FIG. 11 is a block diagram describing a method of preparing device 100 for carrying or storage shown in FIG.

9a and FIG. 9b: first 1102, with device 100 positioned as shown in FIG. 1, remove side attachment 800 from around lower horizontal member 302 of sides 102. Second 1104, remove pin 604. Third 1106, fold sides 102 as described in FIG. 2a to FIG. 2d. Fourth 1108, separate first separable slat 802 and second separable slat 804 of floor platform 108 as shown in FIG. 8c. Fifth 1110, wrap first separable slats 802 and second separable slat 804 around sides 102 as shown in FIG. 9a. Sixth 1112, fastening belt 814 such that slats 802 and 804 are held snugly against folded sides 102. The aforementioned steps may be modified and altered in sequence while not changing the spirit and principle upon which device 102 is ultimately prepared for carrying or storage.

FIG. 12 is a block diagram outlining a method for containing a dog in device 100. The following steps are shown: first 1202, provide aplurality of sides 102 as shown in FIG. 1. In a preferred embodiment of the present invention, four sides 102 are used however, more or less than four sides 102 will work as well. Second 1204, attach an unstable support element 104 to each of the plurality of sides 102 such that each side 102 can teeter and totter relative to each other. Third 1206, provide a plurality of couplers 106 for coupling each of the plurality of sides 102 such that the sides 102 form a container. Fourth 1208, place the dog inside of the container. Fifth 1210, allow the dog to experience the relative movement of sides 102. Creating this experience for the contained dog is accomplished by placing the dog's front legs against upper horizontal member 302 of a side 102. The aforementioned steps may be modified and altered in sequence while not changing the spirit and principle upon which device 100 confines the dog.

While a preferred embodiment of the invention has been disclosed in the foregoing specification, it will be understood to those skilled in the art that variations and modifications thereof can be made without departing from the spirit and scope of the invention, as set forth in the following claims:

What is claimed is:

1. A device for confining an animal comprising:
   a plurality of sides;
   a plurality of couplers, the plurality of couplers loosely coupling each of the sides to allow relative movement of the sides; and
   an unstable support element attached to at least one of the sides, the unstable support element allowing at least one of the sides to move independently relative to an adjacent side.

2. The device of claim 1 wherein the unstable support element is a rocker, the rocker being coupled to the at least one side of the plurality of sides by a spring.

3. The device of claim 1 wherein a coupler of the plurality of couplers is formed of a non-stretchable material surrounded by a flexible material.

4. The coupler of claim 3 wherein the non-stretchable material is selected from the group comprising wire, cable, plastic and cloth and the flexible material is selected from the group comprising rubber, springs, and chains.

5. The device of claim 1 wherein the plurality of sides form a container that is quasistable.

6. The device of claim 1 wherein the plurality of sides are foldable one side onto the other, the foldable sides being transportable and storable.

7. The device of claim 1 wherein the plurality of couplers generate a sound when the animal physically contacts a side of the plurality of sides.

8. A container for confining an animal comprising:
   a plurality of sides;
   a plurality of couplers for loosely coupling each of the sides to a low relative movement of the sides;
   a floor platform, the floor platform being loosely coupled to the sides to allow relative movement of the sides while the floor platform remains stationary; and
   an unstable support element attached to at least one of the sides, the unstable support element allowing at least one of the sides to move independently relative to an adjacent side.

9. The container of claim 8 wherein the plurality of couplers allow relative movement of the sides while prohibiting separation of the sides.

10. The container of claim 8 wherein the floor platform is separable, foldable and removable.

11. The container of claim 8 where the floor platform further comprises:
    at least two separable slats; and
    a material connecting one of the two slats to the other, the material connecting the at least two slats such that a separation distance of the at least two slats is fixed.

12. The at least two slats of claim 11 being attached one to the other to form a continuous surface upon which the contained animal rests.

13. The floor platform of claim 11 wherein the at least two separable slats are separated and wrapped around the plurality of sides thereby forming a carrier by which the sides are carried.

14. The floor platform of claim 13 wherein a strap is attached to the at least two separable slats being wrapped around the plurality of sides, the strap being configured as a leash.

15. The container of claim 8 wherein the floor platform contains a fastener for attaching a replaceable cover.

16. The container of claim 8 wherein the floor platform includes a replaceable cover.

17. The container of claim 8 wherein the floor platform is padded with a soft, water-resistant material.

18. The container of claim 8 wherein the floor platform includes a pocket for storing accessories.

19. The container of claim 8 wherein a scented sheet is positioned upon the floor platform.

20. A method of confining an animal comprising the steps of:
    providing a plurality of sides;
    providing an unstable support element;
    attaching the unstable support element to at least one of the plurality of sides, the unstable support element allowing at least one of the sides to move independently relative to an adjacent side;
    providing a plurality of couplers; and
    attaching the plurality of couplers to the plurality of sides such that the plurality of sides form a container wherein the plurality of sides move relative to each other when brushed by the animal placed in the container.

21. The method of claim 20 wherein the step of providing a plurality of sides further includes attaching a floor platform to the plurality of sides such that the plurality of sides move relative to each other while the floor platform remains stationary.

22. The method of claim 20 further comprising the step of placing the dog inside of the container.

23. A method of collapsing and transporting a container used to confine an animal comprising the steps of:

providing a plurality of loosely coupled sides, providing a floor platform having at least two separable slats, the floor platform being immovably attached to the plurality of sides, providing an attachment device for attaching at least one side of the plurality of sides to a next adjacent side of the plurality of sides thereby forming a gate, removing the attachment device, folding the sides one onto the other, separating the slats of the floor platform; and wrapping the separated slats of the floor platform around the folded sides.

24. The method of claim 23 wherein the step of wrapping the separated slats around the folded sides further includes fastening one slat of the separable slats to the other thereby securely holding the folded sides together.

25. The method of claim 23 wherein the step of wrapping the separable slats around the folded sides further includes step of attaching a leash to the slats.

* * * * *